United States Patent
Hwang et al.

(10) Patent No.: US 10,451,917 B2
(45) Date of Patent: Oct. 22, 2019

(54) POLARIZER, METHOD FOR FABRICATING THE SAME, AND DISPLAY DEVICE HAVING THE SAME

(71) Applicant: LG DISPLAY CO., LTD., Seoul (KR)

(72) Inventors: SeongHan Hwang, Goyang-Si (KR); Chimyung Ahn, Paju-si (KR); YoungWook Kim, Seoul (KR); HyunJong Noh, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/827,373

(22) Filed: Nov. 30, 2017

(65) Prior Publication Data

US 2018/0149916 A1  May 31, 2018

(30) Foreign Application Priority Data

Nov. 30, 2016  (KR) ........................ 10-2016-0162384

(51) Int. Cl.
| | |
|---|---|
| G02F 1/1335 | (2006.01) |
| G02F 1/1343 | (2006.01) |
| G02F 1/1362 | (2006.01) |
| G02F 1/13363 | (2006.01) |

(52) U.S. Cl.
CPC ...... *G02F 1/133528* (2013.01); *G02F 1/1343* (2013.01); *G02F 1/133504* (2013.01); *G02F 2001/133635* (2013.01); *G02F 2001/136281* (2013.01)

(58) Field of Classification Search
CPC .................. G02F 2001/136222; G02F 1/1334
See application file for complete search history.

(56) References Cited

U.S. PATENT DOCUMENTS

| | | | | |
|---|---|---|---|---|
| 4,411,495 | A * | 10/1983 | Beni ..................... | G02F 1/1334 349/91 |
| 8,547,503 | B2 * | 10/2013 | Kubota ............. | G02F 1/134336 349/113 |
| 2006/0245040 | A1 * | 11/2006 | Betrabet ........... | G02F 1/133377 359/318 |
| 2010/0157204 | A1 * | 6/2010 | Ichihashi ........... | C09K 19/3491 349/75 |
| 2012/0320308 | A1 * | 12/2012 | Yeo .................... | G02F 1/133555 349/62 |
| 2013/0107192 | A1 * | 5/2013 | Kuo ........................ | B32B 38/06 349/193 |
| 2014/0226093 | A1 * | 8/2014 | Schwartz ............. | G02B 26/004 349/12 |

(Continued)

FOREIGN PATENT DOCUMENTS

KR   10-2010-0042458   4/2010

*Primary Examiner* — James A Dudek
(74) *Attorney, Agent, or Firm* — Seed Intellectual Property Law Group LLP

(57) ABSTRACT

A polarizer of the present disclosure includes a light control layer which includes a plurality of partitions, a transmissive unit which is provided between the partitions and includes a scattering unit thereabove, and a liquid crystal layer disposed above the partitions and the transmissive unit; and a polarizing layer bonded to the light control layer. According to the present disclosure, a structure which restricts a viewing angle is disposed below a polarizer so that information is exposed only to the user, thereby implementing a narrow viewing angle.

23 Claims, 13 Drawing Sheets

(56) References Cited

U.S. PATENT DOCUMENTS

| | | | |
|---|---|---|---|
| 2016/0139455 A1* | 5/2016 | Yu ..................... | G02F 1/133512 |
| | | | 349/42 |
| 2017/0003548 A1* | 1/2017 | Mizunuma ........ | G02F 1/133617 |
| 2017/0307923 A1* | 10/2017 | Hwang ............... | G02F 1/13338 |
| 2018/0348416 A1* | 12/2018 | Lee ....................... | G02B 5/3016 |
| 2019/0011735 A1* | 1/2019 | Tan ...................... | G02F 1/1334 |
| 2019/0033671 A1* | 1/2019 | Lee ................... | G02F 1/136209 |

* cited by examiner

| ITEMS | VIEWING ANGLE | RELATED ART | EXAMPLE 1 (White CLC) | EXAMPLE 2 (Blue CLC) |
|---|---|---|---|---|
| LUMINANCE RATIO (%) | 0 DEGREE | 100 | 88.9 | 79.3 |
| | VIEWING ANGLE (+30 DEGREES) | 77.0 | 9.6 | 7.4 |
| EFFICIENCY OF OLED ELEMENT (WITH RESPECT TO F/W 1000K) | FRONT SIDE | 100 | 86.7 | 97.0 |

FIG. 11

POLARIZER, METHOD FOR FABRICATING THE SAME, AND DISPLAY DEVICE HAVING THE SAME

CROSS-REFERENCE TO RELATED APPLICATIONS

This application claims the priority of Korean Patent Application No. 10-2016-0162384 filed on Nov. 30, 2016, in the Korean Intellectual Property Office, the disclosure of which is incorporated herein by reference.

BACKGROUND

Technical Field

The present disclosure relates to a display device, and more particularly, to a polarizer which improves a viewing angle blocking function and improves luminance of a display device by adding a light control layer, a method for fabricating the same, and a display device including the same.

Description of the Related Art

In a recent information society, importance of a display device as a visual information delivery medium is further emphasized. Therefore, in order to occupy a major position in the future, the display device needs to satisfy requirements such as low power consumption, small thickness, light weight, and high image quality.

The display device may be divided into a light emission type which emits light by itself, such as a cathode ray tube (CRT), an electro luminescence element (EL), a light emitting diode (LED), a vacuum fluorescent display device (VFD), a field emission display device (FED), and a plasma display panel (PDP) and a non-emission type which cannot emit light by itself, such as a liquid crystal display device (LCD).

The organic electro luminescent element which is one of the flat panel displays (FPD) has characteristics of high luminescence and low operation voltage. Further, the organic electro luminescent element is a self-emitting type display which emits light by itself. Therefore, the organic electro luminescent element has a high contrast ratio, implements a ultra-thin display, and has a response time of several micro seconds (μm) so that it is easy to implement a moving image. Further, the organic electro luminescent element has no limitation of a viewing angle and is stable at a low temperature, and is driven at a low DC voltage of 5 to 15 V so that it is easy to fabricate and design a driving circuit.

Further, a fabricating process of the organic electro luminescent element is performed only by a deposition device and an encapsulation device so that the fabricating process is very simple.

The organic electro luminescent element having the above-described characteristic is mainly classified into a passive matrix type and an active matrix type. In the passive matrix type, scan lines and signal lines intersect each other to configure elements in a matrix. Further, the scan lines are sequentially driven according to the time to drive individual pixels. Therefore, in order to represent a required average luminance, instantaneous luminance needs to be generated as much as an average luminance multiplied by the number of lines.

In the active matrix type, a thin film transistor (TFT) serving as a switching element which turns on/off a pixel area is located for every pixel area. Further, a driving thin film transistor is connected to a power line and an organic electro luminescence diode and is formed for every pixel area.

In this case, a first electrode which is connected to the driving thin film transistor is on/off in the unit of pixel area and a second electrode which is opposite to the first electrode serves as a common electrode so as to form the organic electro luminescence diode together with an organic light emitting layer interposed between two electrodes.

In the active matrix type having the above-described characteristic, a voltage applied to the pixel area is charged in a storage capacitor Cst so as to apply a power until a subsequent frame signal is applied. Therefore, the electro luminescence diode is continuously driven during one screen regardless of the number of scan lines.

Therefore, even though a low current is applied, the same luminance is generated so that low power consumption, high precision, and large-size may be achieved. Therefore, in recent years, an active matrix type organic luminescence element is mainly used.

An organic electro luminescence display device of the related art having the above-described characteristics will be described below with reference to FIG. 1.

FIG. 1 is a schematic cross-sectional view for explaining an organic electro luminescence display device of the related art.

Referring to FIG. 1, the organic electro luminescence display device of the related art includes an organic electro luminescent element 10 and a polarizer 20 disposed above the organic electro luminescent element 10.

Here, even though not illustrated in the drawing, the organic electro luminescence element 10 is formed of a switching thin film transistor (not illustrated), a driving thin film transistor (not illustrated), a storage capacitor (not illustrated), and an organic electro luminescence diode (not illustrated).

The polarizer 20 includes a QWP layer 22 which is a retardation film performing an anti-reflection function, a PVA 24 which is formed above the QWP layer 22 and serves as a linear polarizer, and a TAC 26 which is a transparent base film formed above the PVA 24.

As described above, light emitted from the organic light emitting diode in each pixel area of the organic electro luminescent display device of the related art has broad directivity so that light traveling in a vertical direction is seen only by a user. Further, light traveling to the left and right sides may be seen not only by a user, but also by another person.

Further, the organic electro luminescent element of the related art has a problem in that information that does not want to be exposed to others may be exposed to others regardless of the user's intention due to a wide viewing angle. Specifically, as the spread of a mobile communication, a personal portable multimedia player, and a car navigation increases, there is an increasing demand that does not want to disclose specific information to others. Therefore, the organic electro luminescence display device having a wide viewing angle is not appropriate.

However, the organic electro luminescence display device has other excellent characteristics such as low power consumption, high precision, and large size in addition to the wide viewing angle, so that methods for applying a narrow viewing angle mode to the organic electro luminescence display are demanded.

Specifically, a technique for implementing a narrow viewing angle mode by disposing a viewing angle blocking film above a liquid crystal display device has been suggested in recent years.

However, differently from the liquid crystal display device, the organic electro luminescence display device does not have a backlight so that it is difficult to apply the viewing angle blocking film.

If the viewing angle blocking film is applied to the organic electro luminescence display, a thickness of the product may be undesirably increased, while a luminance of the product may be undesirably reduced.

BRIEF SUMMARY

In various embodiments, the present disclosure provides a polarizer which may implement a narrow viewing angle to expose information only to the user by disposing a structure which restricts the viewing angle on a polarizer, a method for fabricating the same, and a display device including the same.

According to an aspect, there is provided a polarizer including: a light control layer including a plurality of partitions, a transmissive unit which is provided between the partitions and includes a scattering unit thereabove, and a liquid crystal layer disposed above the partitions and the transmissive unit; and a polarizing layer bonded to the light control layer.

According to another aspect, there is provided a method for fabricating a polarizer, including: forming a light control layer by forming a plurality of transmissive units which is spaced apart from each other and includes a scattering unit thereabove, forming partitions between the transmissive units, and forming a liquid crystal layer above the transmissive units and the partitions, forming a polarizing layer to be bonded to the light control layer; and bonding the polarizing layer to the light control layer.

According to still another aspect, there is provided a display device including a polarizer. The display device includes a display panel in which an image is implemented and a polarizer which is disposed above the display panel and includes including a plurality of partitions which is spaced apart from each other, a transmissive unit which is provided between the partitions and includes a scattering unit thereabove, and a liquid crystal layer disposed above the partition and the transmissive unit.

According to the polarizer of the present disclosure, a method for fabricating the same, and a display device including the same, a partition is formed in a polarizer for a display device to block a viewing angle and coats a liquid cholesteric liquid crystal CLC to improve the reduced luminance.

Further, in the polarizer, the method for fabricating the same, and the display device including the same of the present disclosure, when a cholesteric liquid crystal having a strong viewing angle dependency is coated, a scattering unit with a projection shape is formed on an upper surface of the transmissive unit to improve the deterioration of viewing angle characteristic.

Further, as the cholesteric liquid crystal CLC of the present disclosure, white CLC or CLC of various wavelengths are applicable. Specifically, when the blue cholesteric liquid crystal (blue CLC) is applied, the efficiency of the organic electro luminescence display device may be improved.

In the polarizer, the method for fabricating the same, and the display device including the same of the present disclosure, the QWP layer is removed from the polarizing layer by forming a compensating layer which configures the polarizing layer, that is, the QWP layer, in the light control layer so that an overall thickness of the display device is reduced.

Further, in the present disclosure, a light control layer for blocking viewing angle light is formed in the polarizer in the display device so that the luminance of the display device which implements a narrow viewing angle is improved and a lifespan and efficiency of the display device is also improved.

Further, in the present disclosure, a shape of the partition is changed using the cholesteric liquid crystal CLC and a black resin pattern so that a viewing angle color sensitive difference of the cholesteric liquid crystal may be improved.

Further, in the present disclosure, the partition and the cholesteric liquid crystal are integrated to form the light control layer in the polarizing layer so that an overall thickness of the display device may be reduced.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which:

FIG. 11 is a view obtained by measuring luminance and efficiency of an organic electro luminescence display device according to an exemplary embodiment of the present disclosure.

DETAILED DESCRIPTION

Figure 1:
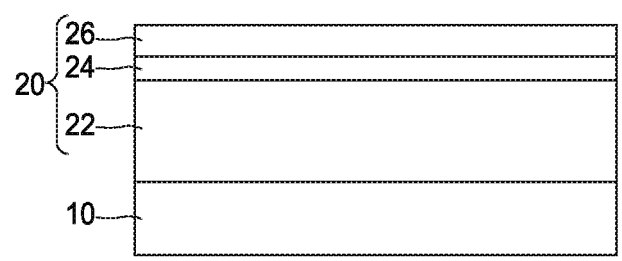
FIG. 1 is a cross-sectional view schematically illustrating an organic electro luminescence display device of the related art.

An exemplary embodiment of an organic electro luminescence display device according to the present disclosure will be described more fully hereinafter with reference to the accompanying drawings, so that those skilled in the art easily carry out the exemplary embodiment of the present disclosure.

In the present disclosure, as an example, an organic electro luminescence display device will be described. However, the present disclosure is not limited thereto, but also applicable to an emission type display device such as a liquid crystal display device (LCD), an electro luminescence (EL) element, a vacuum fluorescent display device (VFD), a field emission display (FED), a plasma display panel (PDP) and a non-emission type display device.

Advantages and characteristics of the present disclosure and a method of achieving the advantages and characteristics will be clear by referring to exemplary embodiments described below in detail together with the accompanying drawings. However, the present disclosure is not limited to exemplary embodiment disclosed herein but will be implemented in various forms. The exemplary embodiments are provided by way of example only so that a person of ordinary skilled in the art can fully understand the disclosures of the present disclosure and the scope of the present disclosure. Therefore, the present disclosure will be defined only by the scope of the appended claims. Like reference numerals indicate like elements throughout the specification.

Figure 2:
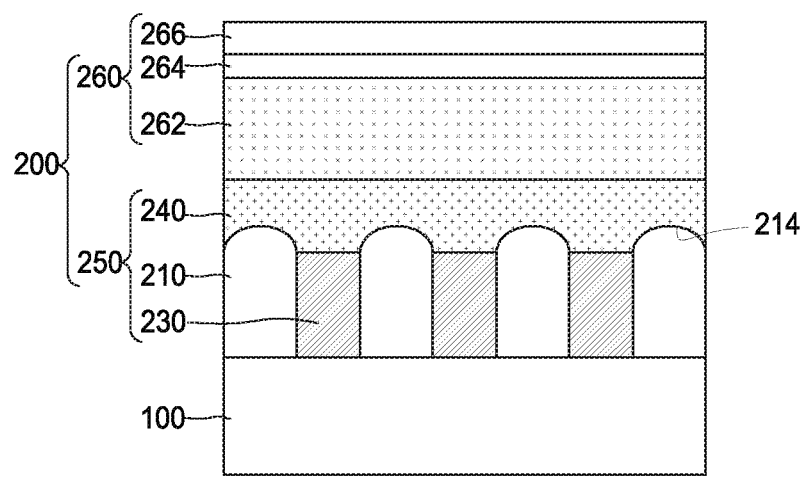
FIG. 2 is a cross-sectional view schematically illustrating an organic electro luminescence display device according to an exemplary embodiment of the present disclosure.

FIG. 2 is a cross-sectional view schematically illustrating an organic electro luminescence display device according to an exemplary embodiment of the present disclosure.

Figure 3:
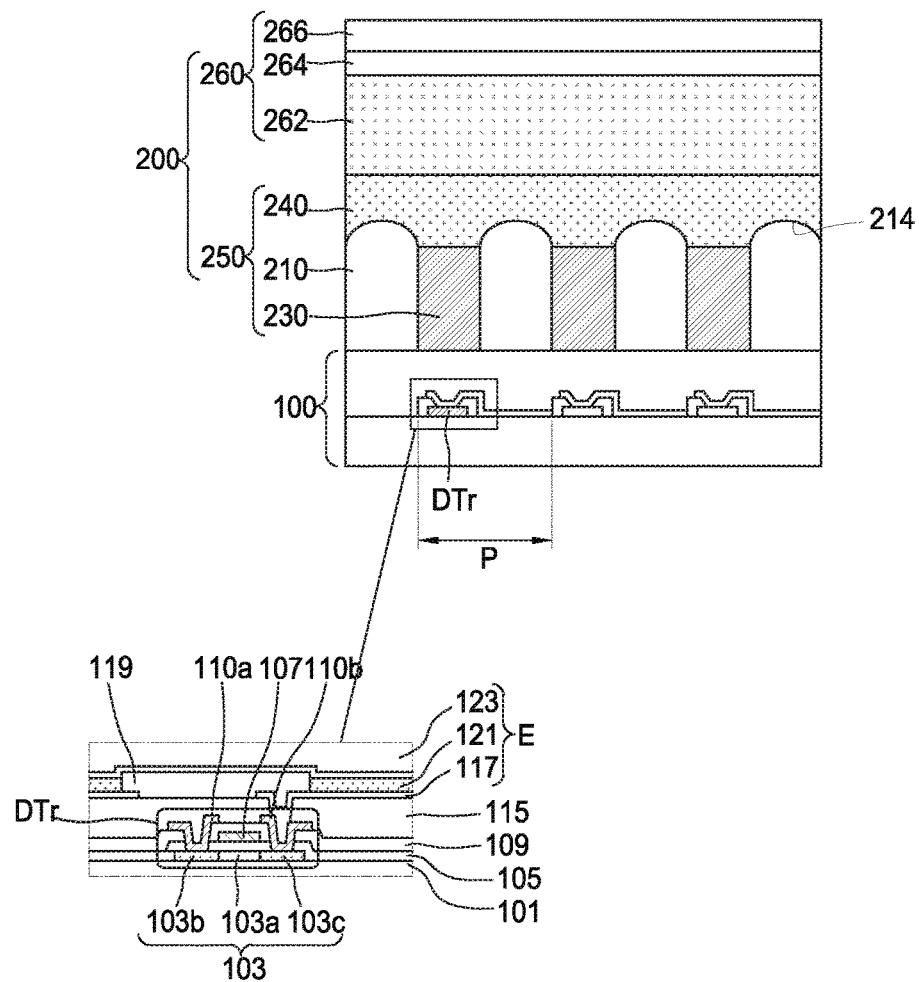
FIG. 3 is a cross-sectional view enlarging an organic electro luminescence display device according to an exemplary embodiment of the present disclosure.

FIG. 3 is a cross-sectional view enlarging an organic electro luminescence display device according to an exemplary embodiment of the present disclosure.

Referring to FIGS. 2 and 3, an organic electro luminescence display device according to an exemplary embodiment of the present disclosure may include an organic electro luminescence display panel 100 in which an image is implemented and a polarizer 200 which is disposed above the organic electro luminescence display panel 100 and includes a light control layer 250 and a polarizing layer 260 disposed above the light control layer 250.

In the organic electro luminescence display panel 100, a substrate 101 on which a thin film transistor Tr and an organic electro luminescence diode E are formed may be encapsulated by a protective film 240.

The organic electro luminescence display panel 100 of the present disclosure will be described in detail below with reference to FIG. 3.

Even though not illustrated in the drawings, in a transparent substrate 101 having an insulating property, a display area (not illustrated) is defined and a non-display area (not illustrated) is defined to the left side of the display area (not illustrated). In the display area (not illustrated), a plurality of pixel areas (not illustrated) defined as an area enclosed by gate lines (not illustrated) and data lines (not illustrated) may be provided. Further, power lines (not illustrated) may be provided to be parallel to the data lines (not illustrated).

A buffer layer (not illustrated) formed of an insulating material, for example, silicon oxide (SiO2) or silicon nitride (SiNx) which is an inorganic insulating material may be formed on the substrate 101. In this case, the reason why the buffer layer (not illustrated) is formed below a semiconductor layer 103 formed by a subsequent process is to avoid deterioration of characteristic of the semiconductor layer 103 due to alkali ions discharged from the inside of the substrate 101 when the semiconductor layer 103 is crystallized.

Further, in each pixel area in the display area (not illustrated) above the buffer layer (not illustrated), the semiconductor layer 103 formed of pure polysilicon to correspond the driving area (not illustrated) and the switching area (not illustrated). A central part of the semiconductor layer 103 may be configured by a first area 103c which forms a channel and second areas 103a and 103b doped with a high concentration impurity on both sides of the first area 103c.

A gate insulating layer 105 may be formed on the buffer layer including the semiconductor layer 103. In the driving area (not illustrated) and the switching area (not illustrated), a gate electrode 107 may be formed on the gate insulating layer 105 to correspond to the first area 103c of the semiconductor layer 103.

Further, a gate line (not illustrated) which is connected to the gate electrode 107 formed in the switching area (not illustrated) and extends in one direction may be formed on the gate insulating layer 105. In this case, the gate electrode 107 and the gate line (not illustrated) may be formed of a first metallic material, for example, any one of aluminum (Al), an aluminum alloy (AlNd), copper (Cu), a copper alloy, molybdenum (Mo), and moly titanium (MoTi) to have a single layer structure. Alternatively, the gate electrode 107 and the gate line may be formed of two or more of the first metallic materials to have a dual layer or triple layer structure. In the drawings, the gate electrode 107 and the gate line (not illustrated) are illustrated to have a single layer structure as an example.

In the meantime, an insulating layer 109 which is formed of an insulating material, for example, silicon oxide SiO2 or silicon nitride SiNx which is an inorganic insulating material may be formed on an entire surface of the display area of the substrate including the gate electrode 107 and the gate line (not illustrated). In this case, the insulating layer 109 and the gate insulating layer 105 therebelow may be equipped with a semiconductor layer contact hole (not illustrated) through which the second areas 103a and 103b located on both sides of the first area 103c of the semiconductor layer 103 are exposed.

A data line (not illustrated) and a power line (not illustrated) spaced apart from the data line may be formed above the insulating layer 109 including the semiconductor layer contact hole (not illustrated). The data line intersects the gate line (not illustrated), defines the pixel area, and is formed of a second metallic material, for example, any one or two or more of aluminum (Al), an aluminum alloy (AlNd), copper (Cu), a copper alloy, molybdenum (Mo), molly titanium (MoTi), chrome (Cr), and titanium (Ti). In this case, the power line (not illustrated) may be formed on a layer on which the gate line (not illustrated) is formed, that is, on the gate insulating layer 205 to be spaced apart from the gate line (not illustrated) in parallel.

In each driving area (not illustrated) and the switching area (not illustrated) on the insulating layer 109, a source electrode 110a and a drain electrode 110b which are spaced apart from each other and are in contact with the second and third areas 103a and 103b exposed through the semiconductor layer contact hole (not illustrated) may be formed. The source electrode 110a and the drain electrode 110b are formed of the same second metallic material as the data line (not illustrated). In this case, the semiconductor layer 103, the gate insulating layer 105, the gate electrode 107, and the insulating layer 109 which are sequentially laminated in the driving area (not illustrated) and the source electrode 110a and the drain electrode 110b which are spaced apart from each other form a thin film transistor DTr for a driving thin film transistor.

In the meantime, in the drawing, all the data line (not illustrated), the source electrode 110a, and the drain electrode 110b have a single layer structure as an example. However, the data line, the source electrode, and the drain electrode may form a dual layer or triple layer structure.

In this case, even though not illustrated in the drawing, the switching thin film transistor (not illustrated) having the same lamination structure as the driving thin film transistor DTr may also be formed in the switching area (not illustrated). In this case, the switching thin film transistor (not illustrated) may be electrically connected to the driving thin film transistor DTr, the gate line (not illustrated), and the data line (not illustrated). That is, the gate line (not illustrated) and the data line (not illustrated) may be connected to the gate electrode (not illustrated) and the source electrode (not illustrated) of the switching thin film transistor (not illustrated). The drain electrode (not illustrated) of the switching thin film transistor (not illustrated) may be electrically connected to the gate electrode 107 of the driving thin film transistor DTr.

The driving thin film transistor DTr and the switching thin film transistor (not illustrated) may have a polysilicon semiconductor layer 103. In this case, even though a top gate type is illustrated as an example, it is obvious that the driving thin film transistor DTr and the switching thin film transistor (not illustrated) may be configured as a bottom gate type having an amorphous silicon semiconductor layer.

When the driving thin film transistor DTr and the switching thin film transistor (not illustrated) are configured as a bottom gate type, a lamination structure thereof is formed by a gate electrode/a gate insulating layer/a semiconductor layer which is spaced apart from a pure amorphous silicon active layer and is formed of an impurity amorphous silicon ohmic contact layer/and a source electrode and a drain electrode which are spaced apart from each other. In this case, the gate line may be formed to be connected to the gate electrode of the switching thin film transistor on a layer on which the gate electrode is formed. Further, the data line may be formed to be connected to the source electrode on a layer on which the source electrode of the switching thin film transistor is formed.

In the meantime, an interlayer insulating layer 115 having a drain contact hole (not illustrated) through which the drain electrode 110b of the driving thin film transistor DTr is exposed may be laminated on the driving thin film transistor DTr and the switching thin film transistor (not illustrated).

In this case, an insulating material, for example, silicon oxide (SiO2) or silicon nitride (SiNx) which is an inorganic insulating material may be used for the interlayer insulating layer 115.

Further, a first electrode 117 which is in contact with the drain electrode 110b of the driving thin film transistor DTr through the drain contact hole (not illustrated) and is separated for every pixel area may be formed on the interlayer insulating layer 115.

Further, a pixel definition layer 119 which is formed of an insulating material, specifically, for example, benzocyclobutene (BCB), polyimide, or photo acryl may be formed in a boundary and a non-display area (not illustrated) for every pixel area on the first electrode 117. In this case, the pixel definition layer 119 may be formed to enclose each pixel area and overlap an edge of the first electrode 115. In the entire display area (not illustrated), the pixel definition layer forms a lattice having a plurality of openings.

In the meantime, an organic light emitting layer 121 which emits red light, green light, and blue light may be formed on the first electrode 117 in each pixel area enclosed by the pixel definition layer 119. In this case, the organic light emitting layer 121 may be configured as a single layer formed of an organic light emitting material. Alternatively, even though not illustrated in the drawing, the organic light emitting layer may be configured as multiple layers of a hole injection layer, a hole transporting layer, an emitting material layer, an electron transporting layer, and an electron injection layer to increase emission efficiency.

Further, a second electrode 123 may be formed on an entire surface of the display area above the organic light emitting layer 121 and the pixel definition layer 119. In this case, the first electrode 117, the second electrode 123, and the organic light emitting layer 121 interposed between the two electrodes 117 and 123 form the organic electro luminescence diode E.

Accordingly, when a predetermined voltage is applied to the first electrode 117 and the second electrode 123 according to a selected color signal, in the organic electro luminescence diode E, holes injected from the first electrode 117 and electrons supplied from the second electrode 123 are transported to the organic light emitting layer 121 to form exciton. When the exciton is transited from an excited state to a ground state, light is generated to be emitted in the form of visible light. At this time, the emitted light passes through the transparent second electrode 123 to go to the outside, so that the organic electro luminescence display panel 100 may implement an arbitrary image.

Further, a protective film 125 which is a thin film is formed on an entire surface of the driving thin film transistor DTr and a light emitting diode E so that an OLED 100 according to an exemplary embodiment of the present disclosure may be encapsulated by the protective film 125.

In the meantime, referring to FIGS. 2 and 3, the light control layer 250 which configures the polarizer 200 may include a plurality of partitions 230 which is spaced apart from each other, light transmissive units 210 which are located between the partitions 230 and includes a scattering element 214 thereabove, and a liquid crystal layer 240 disposed above the partitions 230 and the transmissive units 210. The light transmissive units 210 have a transmissivity suitable for transmitting light, and may be referred to herein as transmissive units. The scattering elements 214 may be portions of the light transmissive units 210, and may be referred to herein as scattering units.

The transmissive unit 210 is an area to which light emitted from the organic electro luminescence display panel 100 transmits in a vertical direction. In this case, the transmissive unit 210 may be desirably formed of refractive index isotropic material. When the refractive index anisotropic material is used for the transmissive unit, generally, it is necessary to use a material having a low anisotropy. However, when the transmissive unit is a compensating layer material, that is, QWP, an anisotropic material may be used.

When the refractive index anisotropic material is used, anisotropy is large in a planar direction of the lens and anisotropy is small in a viewing angle direction.

The scattering unit 214 performs a function of scattering light emitted from the organic electro luminescence display panel 100. The scattering unit 214 may be configured to have a hemispherical, triangle, or polygonal convex projection shape.

The partition 230 performs a function of blocking viewing angle light. The partition 230 may be configured to have a rectangular, a triangular, or trapezoidal shape. The partition 230 may contain a black resin material.

The liquid crystal layer 240 may include a cholesteric liquid crystal CLC. In this case, the cholesteric liquid crystal improves luminance. A refractive index anisotropic material may be desirably used for the liquid crystal layer 240. A refractive index of the liquid crystal layer 240 is approximately 1.55 to 1.6 and a refractive index of the transmissive unit is approximately 1.5 to 1.6. A polarizing layer 260 which configures the polarizer 200 may include a compensating layer 262, a linear polarizing layer 264 disposed above the compensating layer 262, and a transparent base layer 266 disposed above the linear polarizing layer 264.

The compensating layer 262 may be used as an anti-reflection layer which blocks external light entering from the outside. A material of the compensating layer 262 may be selected from materials including quarter wave plate (QWP), PC, COP, and acryl.

The linear polarizing layer 264 is formed by adsorbing a halogen salt crystal such as iodine onto a poly-vinyl alcohol (hereinafter, referred to as "PVA") film and then stretching the PVA film in a specific direction to align iodine crystals to be parallel in the stretching direction.

The iodine crystals absorb light which is incident in a first direction and transmits light which is incident in a second direction perpendicular to the first direction to achieve the polarizing function.

The transparent base layer 266 is a film which supports and protects the polarizing layer 260. In this case, constituent materials of the transparent base layer need to be optically transparent, do not cause double refraction, have heat resistance, and have a high mechanical strength to physically support and protect the polarizing layer 260.

Further, a surface thereof is vast and has a property which is capable of being bonded to a bonding agent or an adhesive. For example, the constituent material includes acetate resin such as triacetyl cellulose (TAC), polyester resin, polyether sulfone resin, polycarbonate resin, polyamide resin, polyimide resin, polyolefin resin, acrylic resin, and polynorbornen resin.

In consideration of polarizing property and durability, desirably, a triacetyl cellulose (TAC) film in which a surface is saponified with alkali may be used for the transparent base layer 266.

Figure 4:
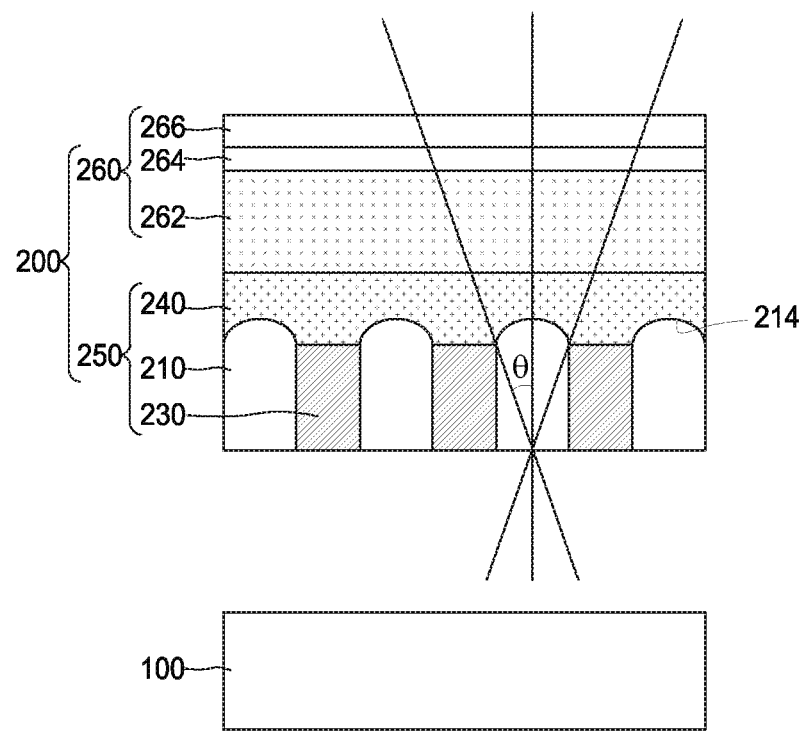
FIG. 4 is a cross-sectional view illustrating an organic electro luminescence display device according to an exemplary embodiment of the present disclosure and is a view schematically illustrating a state in which a narrow viewing angle is implemented by a light control layer in a polarizer.

FIG. 4 is a cross-sectional view illustrating an organic electro luminescence display device according to an exemplary embodiment of the present disclosure and is a view schematically illustrating a state in which a narrow viewing angle is implemented by a light control layer in a polarizer.

Referring to FIG. 4, light emitted from the organic electro luminescence display panel 100 is scattered by the scattering unit 214 of the transmissive unit 210 so that a traveling direction of light is a vertical direction. Further, the partition 230 blocks viewing angle light so that the emitted light travels only in the vertical direction. Therefore, the narrow viewing angle may be implemented.

Figure 5:
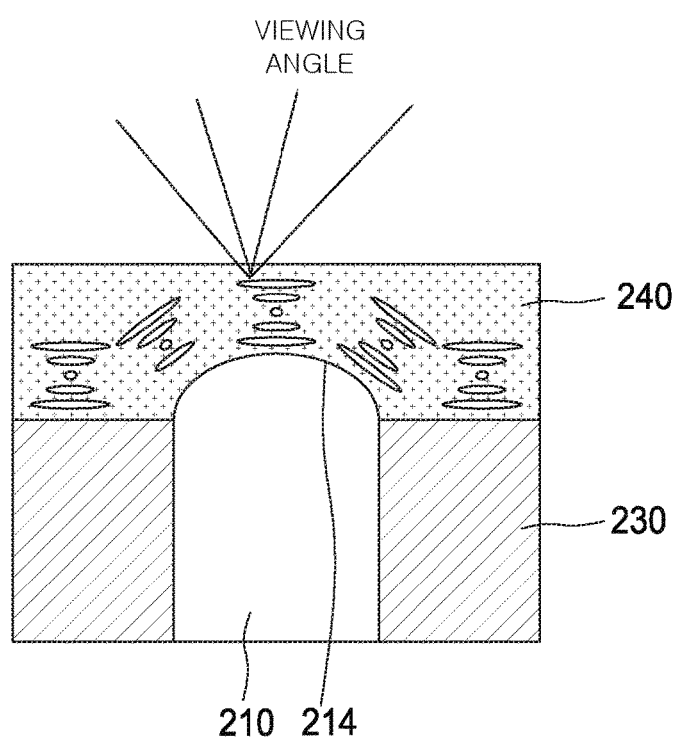
FIG. 5 is a view for explaining improvement of viewing angle color change in a cholesteric liquid crystal in a light control layer in an organic electro luminescence display device according to an exemplary embodiment of the present disclosure.

FIG. 5 is a view for explaining improvement of viewing angle color change in a cholesteric liquid crystal in a light control layer in an organic electro luminescence display device according to an exemplary embodiment of the present disclosure.

Referring to FIG. 5, when the refractive index anisotropic material is used, anisotropy is large in a planar direction of the lens and anisotropy is small in a viewing angle direction.

Therefore, a tilting angle of the cholesteric liquid crystal (CLC: not illustrated) is arbitrarily adjusted by the scattering unit 214 formed on an upper surface of the transmissive unit 210 to arbitrary reflect incident light. Therefore, color change may be improved.

A method for fabricating an organic electro luminescence display device including a polarizer according to another exemplary embodiment of the present disclosure will be described below.

First, a process of fabricating an organic electro luminescence display device 100 according to an exemplary embodiment of the present disclosure will be schematically described below with reference to FIG. 3.

As illustrated in the drawing, first, a buffer layer (not illustrated) formed of an insulating material, for example, silicon oxide (SiO2) or silicon nitride (SiNx) which is an inorganic insulating material may be formed on the transparent substrate 101. In this case, the reason why the buffer layer (not illustrated) is formed below a semiconductor layer 103 formed by a subsequent process is to avoid deterioration of characteristic of the semiconductor layer 103 due to alkali ions discharged from the inside of the substrate 101 when the semiconductor layer 103 is crystallized.

Next, in each pixel area (not illustrated) in the display area (not illustrated) above the buffer layer (not illustrated), the semiconductor layer 103 formed of pure polysilicon to correspond the driving area (not illustrated) and the switching area (not illustrated). A central part of the semiconductor layer 103 may be configured by a first area 103c which forms a channel and second areas 103a and 103b doped with a high concentration impurity on both sides of the first area 103c.

Next, a gate insulating layer 105 is formed on the buffer layer including the semiconductor layer 103 and a gate electrode 107 may be formed in the driving area (not illustrated) and the switching area (not illustrated) on the gate insulating layer 105 so as to correspond to the first area 103a of each semiconductor layer 103.

In this case, a gate line (not illustrated) which is connected to the gate electrode 107 formed in the switching area (not illustrated) and extends in one direction may be formed on the gate insulating layer 105. In this case, the gate electrode 107 and the gate line (not illustrated) may be formed of a first metallic material, for example, any one of aluminum (Al), an aluminum alloy (AlNd), copper (Cu), a copper alloy, molybdenum (Mo), and moly titanium (MoTi) to have a single layer structure. Further, the gate electrode 107 and the gate line may be formed of two or more of the first metallic materials to have a dual layer or triple layer structure. In the drawings, the gate electrode 107 and the gate line (not illustrated) are illustrated to have a single layer structure as an example.

Next, an insulating layer 109 which is formed of an insulating material, for example, silicon oxide SiO2 or silicon nitride SiNx which is an inorganic insulating material may be formed on an entire surface of the display area above the gate electrode 107 and the gate line (not illustrated).

Next, the insulating layer 109 and the gate insulating layer 105 therebelow may be selectively patterned to form a semiconductor layer contact hole (not illustrated) through which the second and third areas 103a and 103b located on both sides of the first area 103c of the semiconductor layer 103 are exposed.

Next, a second metal layer (not illustrated) which intersects the gate line (not illustrated) and defines the pixel area (not illustrated) may be formed above the insulating layer 109 including the semiconductor contact hole (not illustrated). In this case, the second metal layer (not illustrated) may be formed of any one or two or more of aluminum (Al), an aluminum alloy (AlNd), copper (Cu), a copper alloy, molybdenum (Mo), moly titanium (MoTi), chrome (Cr), and titanium (Ti).

Next, the second metal layer (not illustrated) is selectively patterned to form a data line (not illustrated) which intersects the gate line (not illustrated) and defines the pixel area (not illustrated) and a power line (not illustrated) which is spaced apart from the data line. In this case, the power line (not illustrated) may be formed on a layer on which the gate line (not illustrated) is formed, that is, on the gate insulating layer to be spaced apart from the gate line (not illustrated) in parallel.

When the data line (not illustrated) is formed, a source electrode 110a and a drain electrode 110b which are formed of the same second metallic material as the data line (not illustrated) may be simultaneously formed. The source electrode and the drain electrode are spaced apart from the driving area (not illustrated) and the switching area (not illustrated) and are in contact with the second and third areas 103a and 103b which are exposed through the semiconductor layer contact hole (not illustrated) respectively, on the insulating layer 109. In this case, the semiconductor layer, the gate insulating layer, the gate electrode 107, and the insulating layer 109 which are sequentially laminated in the driving area (not illustrated) and the source electrode 110a and the drain electrode 110b which are spaced apart from each other form a driving thin film transistor DTr.

In the meantime, in the drawing, all the data line (not illustrated), the source electrode 110a, and the drain electrode 110b have a single layer structure as an example. However, the data line, the source electrode, and the drain electrode may form a dual layer or triple layer structure.

In this case, even though not illustrated in the drawing, the switching thin film transistor (not illustrated) having the same lamination structure as the driving thin film transistor DTr may also be formed in the switching area (not illustrated). In this case, the switching thin film transistor (not illustrated) may be electrically connected to the driving thin film transistor DTr, the gate line (not illustrated), and the data line 113. That is, the gate line (not illustrated) and the data line (not illustrated) may be connected to the gate electrode (not illustrated) and the source electrode (not illustrated) of the switching thin film transistor (not illustrated). The drain electrode (not illustrated) of the switching thin film transistor (not illustrated) may be electrically connected to the gate electrode 107 of the driving thin film transistor DTr.

In the substrate 101 for the organic electro luminescence element according to the present disclosure, for example, the driving thin film transistor DTr and the switching thin film transistor (not illustrated) have a polysilicon semiconductor layer 103 and are configured as a top gate type. However, it is obvious that the driving thin film transistor DTr and the switching thin film transistor (not illustrated) may be configured as a bottom gate type having an amorphous silicon semiconductor layer.

When the driving thin film transistor DTr and the switching thin film transistor (not illustrated) are configured as a bottom gate type, a lamination structure thereof is formed by a gate electrode/a gate insulating layer/a semiconductor layer which is spaced apart from a pure amorphous silicon active layer and is formed of an impurity amorphous silicon ohmic contact layer/and a source electrode and a drain electrode which are spaced apart from each other. In this case, the gate line may be formed to be connected to the gate electrode of the switching thin film transistor on a layer on which the gate electrode is formed. Further, the data line may be formed to be connected to the source electrode on a layer on which the source electrode of the switching thin film transistor is formed.

Next, an interlayer insulating layer 115 may be formed on the driving thin film transistor DTr and the switching thin film transistor (not illustrated). In this case, an insulating material, for example, silicon oxide SiO2 or silicon nitride SiNx which is an inorganic insulating material may be used for the interlayer insulating layer 115.

Next, the interlayer insulating layer 115 is selectively patterned to form a drain contact hole (not illustrated) through which the drain electrode 110b of the thin film transistor DTr is exposed. Next, even though not illustrated in the drawing, after depositing a third metal layer (not illustrated) on the interlayer insulating layer 115, the third metal layer (not illustrated) is selectively patterned to form a first electrode 117 which is in contact with the drain electrode 110b of the driving thin film transistor DTr through the drain contact hole (not illustrated) and separated for every pixel area. In this case, the third metal layer (not illustrated) is formed of any one or two or more of aluminum (Al), an aluminum alloy (AlNd), copper (Cu), a copper alloy, molybdenum (Mo), moly titanium (MoTi), chrome (Cr), and titanium (Ti).

Even though not illustrated in the drawing, an insulating material layer (not illustrated) formed, for example, of benzocyclobutene (BCB), polyimide, or photoacryl may be formed in a boundary of the pixel area and the non-display area (not illustrated) on the first electrode 117.

Next, the insulating material layer (not illustrated) is selectively patterned to form a pixel definition layer 119. In this case, the pixel definition layer 119 may be formed to enclose each pixel area and overlap an edge of the first electrode 117. In the entire display area, the pixel definition layer forms a lattice having a plurality of openings.

Next, an organic light emitting layer 121 which emits red light, green light, and blue light may be formed on the first electrode 117 in each pixel area enclosed by the pixel definition layer 119. In this case, the organic light emitting layer 121 may be configured as a single layer formed of an organic light emitting material. Alternatively, even though not illustrated in the drawing, the organic light emitting layer may be configured as multiple layers of a hole injection layer, a hole transporting layer, an emitting material layer, an electron transporting layer, and an electron injection layer to increase emission efficiency.

Next, a second electrode 123 may be formed on an entire surface of the display area including the organic light emitting layer 121 and an upper portion of the pixel definition layer 119. In this case, the second electrode 123 may select at least any one of transparent conductive materials which transmit light, for example, conductive materials including ITO and IZO.

By doing this, the organic electro luminescence diode E formed by the first electrode 117, the second electrode 123, and the organic light emitting layer 121 interposed between the two electrodes 117 and 123 may be configured.

When a predetermined voltage is applied to the first electrode 117 and the second electrode 123 according to a selected color signal, in the organic electro luminescence diode E, holes injected from the first electrode 117 and electrons supplied from the second electrode 123 are transported to the organic light emitting layer 121 to form exciton. When the exciton is transited from an excited state to a ground state, light is generated to be emitted in the form of visible light. At this time, the emitted light at this time passes through the transparent second electrode 123 to go to the outside, so that the organic electro luminescence display panel 100 may implement an arbitrary image.

Next, a passivation layer (not illustrated) formed of an insulating material, specifically, silicon oxide SiO2 or silicon nitride SiNx which is an inorganic insulating material, may be formed on an entire surface of the substrate including the second electrode 123. In this case, it is difficult to completely suppress moisture permeation to the organic light emitting layer 121 only using the second electrode 123. Therefore, the passivation layer (not illustrated) is formed above the second electrode 123 to completely suppress moisture permeation to the organic light emitting layer 121.

Next, the protective film 125 is bonded to the entire surface of the substrate including the passivation layer to encapsulate the organic light emitting diode E to form a panel status, to finish the process of fabricating the organic electro luminescence display panel 100 of the present disclosure.

FIGS. 6A to 6I are cross-sectional views schematically illustrating a fabricating process of an organic electro luminescence display device including a polarizer according to an exemplary embodiment of the present disclosure.

Figure 6A:
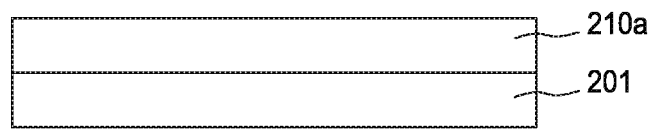
FIGS. 6A to 6I are cross-sectional views schematically illustrating a fabricating process of an organic electro luminescence display device according to an exemplary embodiment of the present disclosure.

A process of fabricating a polarizer according to an exemplary embodiment of the present disclosure will be described. As illustrated in FIG. 6A, a transparent resin material is coated on a dummy substrate 201 to form a transparent resin layer 210 and a prebaking process may be performed.

Figure 6B:
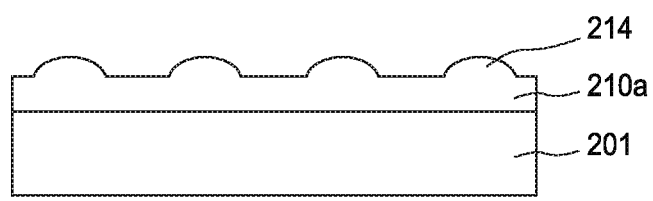

Next, as illustrated in FIG. 6B, a roll with a surface on which a shape of a scattering unit is patterned is disposed on an upper surface of the transparent resin layer 210a to pressurize the roll. In this case, a surface curve is formed on the upper surface of the transparent resin layer 210a to form a plurality of scattering units 214. Thereafter, the transparent resin layer 210a on which the scattering units 214 are formed may be cured.

In this case, the scattering unit 214 may perform a function of scattering light emitted from the organic electro luminescence display panel 100 to change a traveling path to a predetermined direction. The scattering unit 214 may be formed to have a hemispherical, triangle, or polygonal convex projection shape.

Further, a plurality of scattering units 214 may be formed on an upper surface of the transparent resin layer 210 with predetermined intervals.

Figure 6C:
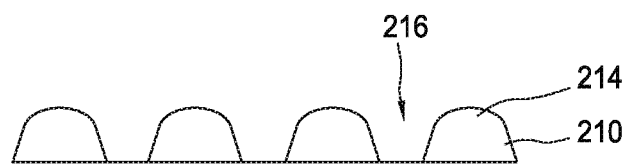

Next, as illustrated in FIG. 6C, the transparent resin layer 210a corresponding to an area excluding an area where the scattering unit 214 is formed, that is, an area between the scattering units 214, is selectively etched to form the openings 216. In this case, the transparent resin layer 210a in an area excluding the opening 216 may be formed as a transmissive unit 210. Further, the scattering unit 214 remains on an upper surface of the transmissive unit 210.

In this case, as the transmissive unit 210, a polymer film material such as TAC, PET, and Acryl may be used in addition to the transparent resin layer.

Further, the opening 216 may be formed to have a rectangular, trapezoidal, and triangular shape. The transmissive unit 210 is an area to which light emitted from the organic electro luminescence display panel 100 transmits in a vertical direction.

Figure 6D:
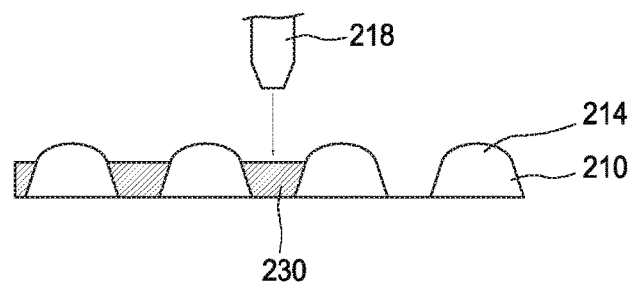
Figure 6E:
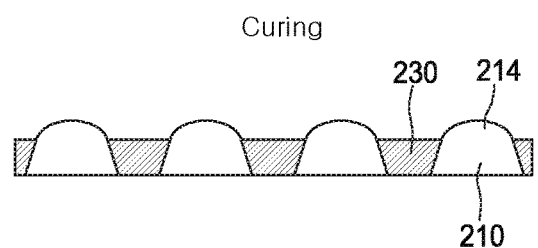

Next, as illustrated in FIGS. 6D and 6E, a black resin is buried in the opening 216 and then cured to form the partition 230. The partition 230 performs a function of blocking viewing angle light. In this case, the partition 230 may be formed to have a rectangular, a trapezoidal, and a triangular shape according to the shape of opening 216. The partition 230 may contain a black resin material.

Figure 6F:
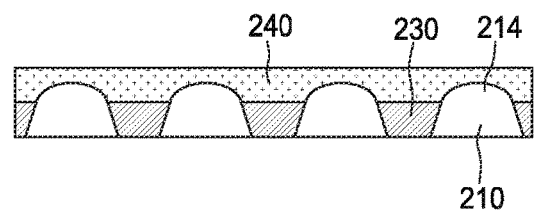

Next, as illustrated in FIG. 6F, a liquid cholesteric liquid crystal layer (CLC) 240 is coated on the transmissive unit 210 and the partition 230. In this case, the cholesteric liquid crystal layer 240 may improve the luminance. A refractive index of the liquid crystal layer 240 is approximately 1.55 to 1.6 and a refractive index of the transmissive unit is approximately 1.5 to 1.6.

Figure 6G:
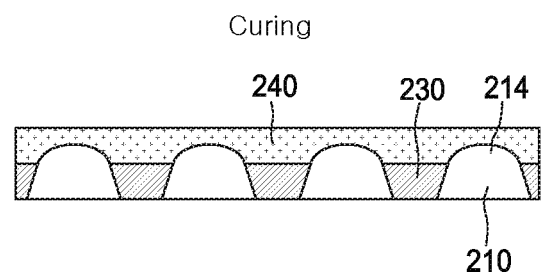

Next, as illustrated in FIG. 6G, the cholesteric liquid crystal layer 240 is subjected to a curing process to complete the process for forming the light control layer 250.

Figure 6H:
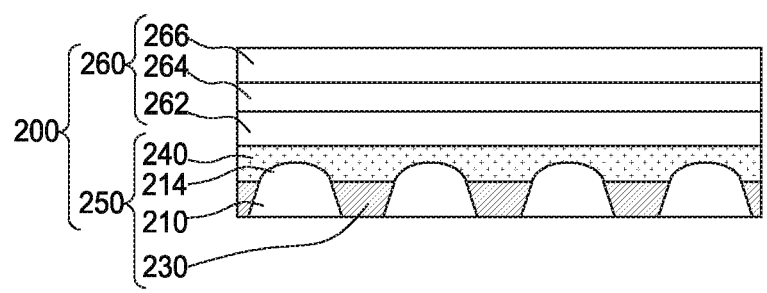

Next, as illustrated in FIG. 6H, the polarizing layer 260 configured by the compensating layer 262, the linear polarizing layer 264, and the transparent base layer 266 is bonded onto the light control layer 250. In this case, the compensating layer 262 which configures the polarizing layer 260 may be bonded onto the cholesteric liquid crystal layer 240 which configures the light control layer 250.

The compensating layer 262 may be used as an antireflection layer which blocks external light entering from the outside. A material of the compensating layer 262 may be selected from materials including quarter wave plate (QWP), PC, COP, TAC, PET, and acryl.

Further, the linear polarizing layer 264 is formed by adsorbing a halogen salt crystal such as iodine onto a poly-vinyl alcohol (hereinafter, referred to as "PVA") film and then stretching the PVA film in a specific direction to align iodine crystals to be parallel in the stretching direction.

The iodine crystals absorb light which is incident in a first direction and transmits light which is incident in a second direction perpendicular to the first direction to achieve the polarizing function.

The transparent base layer 266 is a film which supports and protects the polarizing layer 260 and constituent materials thereof need to be optically transparent and do not cause double refraction. Further, the transparent base layer 266 need to have heat resistance and have a high mechanical strength to physically support and protect the polarizing layer 260.

Further, a surface thereof needs to be vast and have a property which is capable of being bonded to a bonding agent or an adhesive. For example, the constituent material includes acetate resin such as triacetyl cellulose (TAC), polyester resin, polyether sulfone resin, polycarbonate resin, polyamide resin, polyimide resin, polyolefin resin, acrylic resin, and polynorbornen resin.

In consideration of polarizing property and durability, desirably, a triacetyl cellulose (TAC) film in which a surface is saponified with alkali may be used for the transparent base layer 266.

By doing this, a process for fabricating the polarizer 200 configured by the light control layer 250 and the polarizing layer 260 may be completed.

Figure 6I:
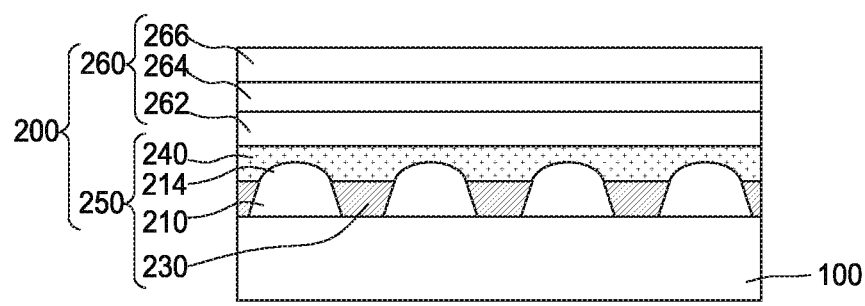

Next, as illustrated in FIG. 6I, the polarizer 200 is disposed on the organic electro luminescence display panel 100 to be bonded.

Therefore, light traveling in a vertical direction among light emitted from the organic light emitting layer 121 of each pixel area of the organic electro luminescence display panel 100 is seen only by the user. Further, the traveling direction of the light traveling to left and right sides is changed by the partition 230 and the scattering unit 214 of the transmissive unit 210 equipped in the light control layer 250 of the polarizer 200 so as to be seen only by the user. Therefore, a narrow viewing angle mode is implemented.

Figure 7:
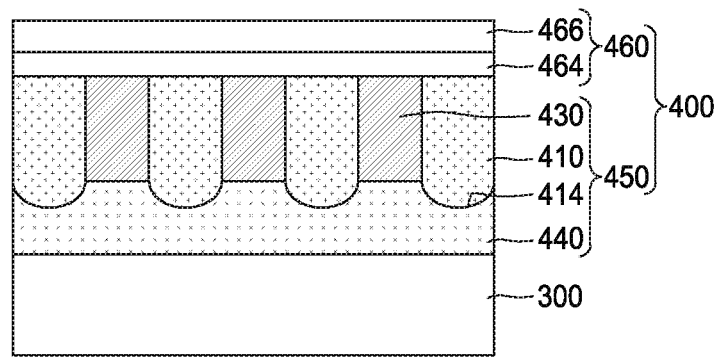
FIG. 7 is a cross-sectional view schematically illustrating an organic electro luminescence display device according to another exemplary embodiment of the present disclosure.

FIG. 7 is a cross-sectional view schematically illustrating an organic electro luminescence display device including a polarizer according to another exemplary embodiment of the present disclosure.

Figure 8:
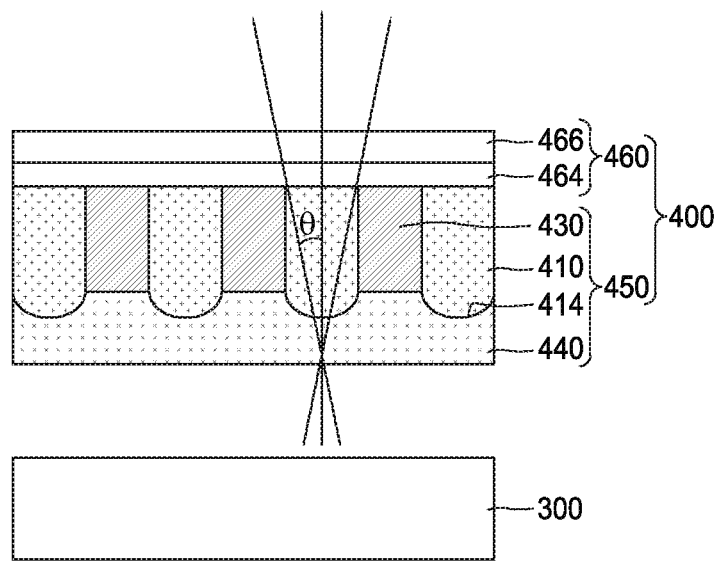
FIG. 8 is a cross-sectional view illustrating an organic electro luminescence display device according to another exemplary embodiment of the present disclosure and is a view schematically illustrating a state in which a narrow viewing angle is implemented by a light control layer in a polarizer.

FIG. 8 is a cross-sectional view illustrating an organic electro luminescence display device including a polarizer according to another exemplary embodiment of the present disclosure and is a view schematically illustrating a state in which a narrow viewing angle is implemented by a light control layer in a polarizer.

Referring to FIGS. 7 and 8, an organic electro luminescence display device including a polarizer according to another exemplary embodiment of the present disclosure may include an organic electro luminescence display panel 300 in which an image is implemented and a polarizer 400 which is disposed above the organic electro luminescence display panel 300 and includes a light control layer 450 and a polarizing layer 480 disposed above the light control layer 450.

Even though not illustrated in the drawings, in the organic electro luminescence display panel 300, a substrate (not illustrated) on which a thin film transistor (not illustrated) and an organic electro luminescence diode are formed may be encapsulated by a protective film (not illustrated).

Here, the organic electro luminescence display panel 300 according to another exemplary embodiment of the present disclosure has the same components as the organic electro luminescence display panel 100 according to an exemplary embodiment of the present disclosure illustrated in FIGS. 2 and 3. Therefore, description of the components of the organic electro luminescence display panel 300 according to another exemplary embodiment of the present disclosure will be omitted.

Referring to FIG. 7, a light control layer 450 which configures a polarizer 400 may include a plurality of partitions 430 which is spaced apart from each other, a compensating layer 410 which is located between the partitions 430 and includes a scattering unit 414 thereabove, and a liquid crystal layer 440 disposed above the partitions 430 and the compensating layer 410.

The compensating layer 410 may be used as an antireflection layer which blocks external light entering from the outside. A material of the compensating layer 410 as the anti-reflection layer may be quarter wave plate (QWP), PC, COP, or acryl.

The scattering unit 414 performs a function of scattering light emitted from the organic electro luminescence display panel 300. The scattering unit 414 may be formed to have a hemispherical, triangle, or polygonal convex projection shape.

The partition 430 performs a function of blocking viewing angle light. The partition 430 may be configured to have a rectangular, a triangular, or trapezoidal shape.

The liquid crystal layer 440 may include a cholesteric liquid crystal CLC. In this case, the cholesteric liquid crystal improves luminance.

The polarizing layer 460 which configures the polarizer 400 may include a linear polarizing layer 464 and a transparent base layer 466 disposed above the linear polarizing layer 464.

The linear polarizing layer 464 is formed by adsorbing a halogen salt crystal such as iodine onto a poly-vinyl alcohol (hereinafter, referred to as "PVA") film and then stretching the PVA film in a specific direction to align iodine crystals to be parallel in the stretching direction.

The iodine crystals absorb light which is incident in a first direction and transmits light which is incident in a second direction perpendicular to the first direction to achieve the polarizing function.

The transparent base layer 466 is a film which supports and protects the polarizing layer 460 and a constituent material thereof needs to be transparent and does not cause double refraction. Further, the transparent base layer 466 needs to have heat resistance and have a high mechanical strength to physically support and protect the polarizing layer 460.

Further, a surface thereof needs to be vast and have a property which is capable of being bonded to a bonding agent or an adhesive. For example, the constituent material includes acetate resin such as triacetyl cellulose (TAC), polyester resin, polyether sulfone resin, polycarbonate resin, polyamide resin, polyimide resin, polyolefin resin, acrylic resin, and polynorbornen resin.

In consideration of polarizing property and durability, desirably, a triacetyl cellulose (TAC) film in which a surface is saponified with alkali may be used as the transparent base layer 466.

As illustrated in FIG. 8, light emitted from the organic electro luminescence display panel 300 is scattered by the cholesteric liquid crystal layer 440 of the light control layer 450 and the scattering unit 414 of the compensating layer 410. A traveling direction of the light is changed by the compensating layer 410 so that light travels in the vertical direction. Further, viewing angle light of light emitted from the organic electro luminescence display panel 300 is blocked by the partition 430 so that light emitted from the organic electro luminescence display panel 300 travels only in the vertical direction so that viewing angle may be implemented.

Therefore, in the organic electro luminescence display device according to another exemplary embodiment of the present disclosure, the compensating layer 410 in the polarizing layer is formed in the light control layer 450 so that an overall thickness of the display device may be reduced.

In the meantime, a method for fabricating an organic electro luminescence display device including a polarizer according to another exemplary embodiment of the present disclosure will be described below.

FIGS. 9A to 9J are cross-sectional views schematically illustrating a fabricating process of an organic electro luminescence display device including a polarizer according to another exemplary embodiment of the present disclosure.

Here, the processes of fabricating an organic electro luminescence display panel 300 according to another exemplary embodiment of the present disclosure are the same as the process of fabricating the organic electro luminescence display panel 100 according to an exemplary embodiment of the present disclosure. Therefore, description thereof will be omitted.

Figure 9A:
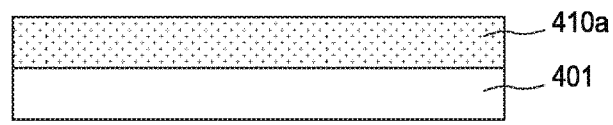
FIGS. 9A to 9J are cross-sectional views schematically illustrating a fabricating process of an organic electro luminescence display device according to another exemplary embodiment of the present disclosure.

As illustrated in FIG. 9A, a material for a retardation film is coated on a dummy substrate 301 to form a retardation layer 410a and then a prebaking process may be performed. In this case, a material for the retardation layer 410a may be selected from materials including QWP, PC, COP, and acryl.

Figure 9B:
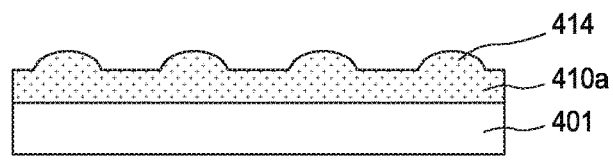

Next, as illustrated in FIG. 9B, a roll (not illustrated) with a surface on which a shape of a scattering unit is patterned is disposed on an upper surface of the transparent resin layer 410a to pressurize the roll. In this case, a surface curve is formed on the upper surface of the transparent resin layer 410a to form a plurality of scattering units 414. Thereafter, the transparent resin layer 410a on which the scattering units 414 are formed may be cured.

In this case, the scattering unit 414 may perform a function of scattering light emitted from the organic electro luminescence display panel 300 to change a traveling path to a predetermined direction. The scattering unit 414 may be configured to have a hemispherical, triangle, or polygonal convex projection shape.

Further, a plurality of scattering units 414 may be formed on an upper surface of the retardation layer 410a with predetermined intervals.

Figure 9C:
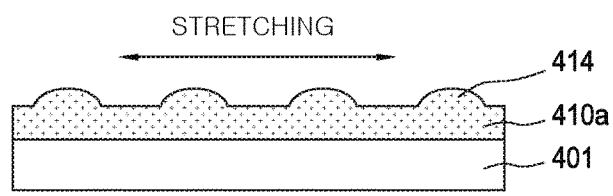

Next, as illustrated in FIG. 9C, the retardation layer 410a is stretched to the left or right direction or up or down direction to implement phase difference. In this case, the retardation layer 410a may be changed to a compensating layer 410 by the stretching process.

Figure 9D:
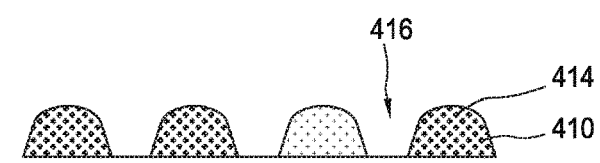

Next, as illustrated in FIG. 9D, the retardation layer 410a corresponding to an area excluding an area where the scattering unit 414 is formed, that is, an area between the scattering units 414, is selectively etched to form the openings 416. In this case, the retardation layer 410a in an area excluding the opening 416 may be changed to the compensating layer 410. Further, the scattering unit 414 remains on an upper surface of the compensating layer 410.

In this case, the opening 416 may be formed to have a rectangular, trapezoidal, and triangular shape. The compensating layer 410 may perform an anti-reflection function which blocks external light entering from the outside.

Figure 9E:
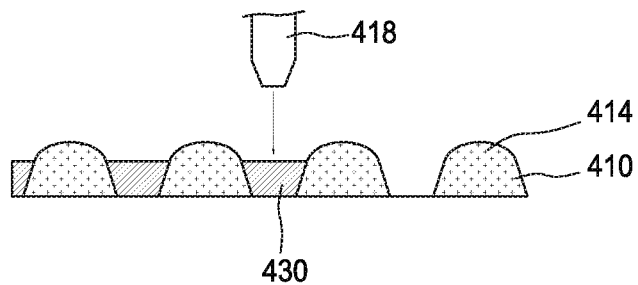
Figure 9F:
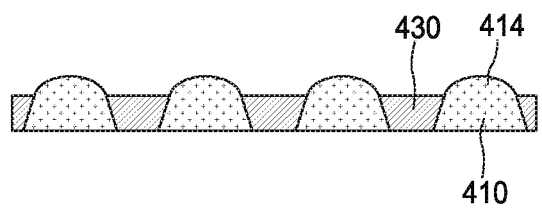

Next, as illustrated in FIGS. 9E and 9F, a black resin is buried in the opening 416 and then cured to form the partition 430. The partition 430 performs a function of blocking viewing angle light. In this case, the partition 430 may be formed to have a rectangular, a trapezoidal, and a triangular shape according to the shape of opening 416. The partition 430 may contain a black resin material.

Figure 9G:
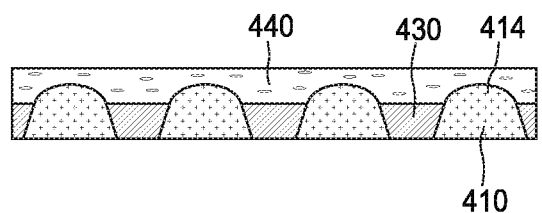

Next, as illustrated in FIG. 9G, a liquid cholesteric liquid crystal layer (CLC) 440 is coated on the entire surfaces of the compensating layer 410 and the partition 430. In this case, the cholesteric liquid crystal layer 440 may improve the luminance.

Figure 9H:
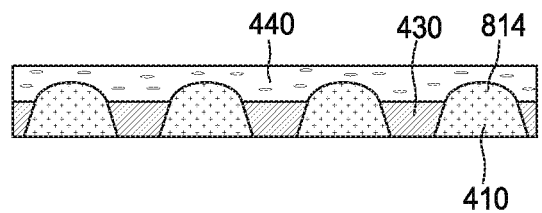

Next, as illustrated in FIG. 9H, the cholesteric liquid crystal layer 440 is subjected to a curing process to complete the process for forming the light control layer 450.

Figure 9I:
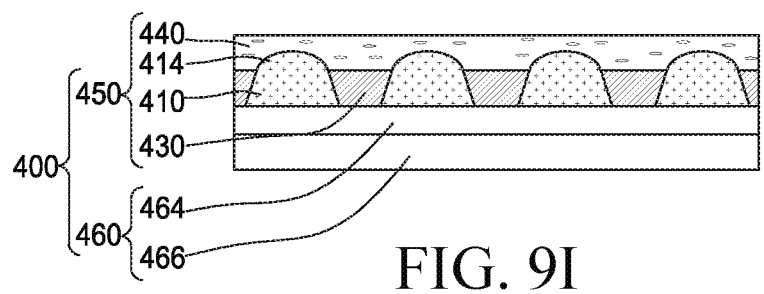

Next, as illustrated in FIG. 9I, a polarizing layer 460 configured by a linear polarizing layer 464 and a transparent base layer 466 may be bonded onto a rear surface of the compensating layer 410 and the partition 430 of the light control layer 450.

In this case, the linear polarizing layer 464 is formed by adsorbing a halogen salt crystal such as iodine onto a poly-vinyl alcohol (hereinafter, referred to as "PVA") film and then stretching the PVA film in a specific direction to align iodine crystals to be parallel in the stretching direction.

The iodine crystals absorb light which is incident in a first direction and transmits light which is incident in a second direction perpendicular to the first direction to achieve the polarizing function.

The transparent base layer 466 is a film which supports and protects the polarizing layer 460 and a constituent material thereof needs to be transparent and does not cause double refraction. Further, the transparent base layer 466 needs to have heat resistance and have a high mechanical strength to physically support and protect the polarizing layer 460.

Further, a surface thereof needs to be vast and have a property which is capable of being bonded to a bonding agent or an adhesive. For example, the constituent material includes acetate resin such as triacetyl cellulose (TAC), polyester resin, polyether sulfone resin, polycarbonate resin, polyamide resin, polyimide resin, polyolefin resin, acrylic resin, and polynorbornen resin.

In consideration of polarizing property and durability, desirably, a triacetyl cellulose (TAC) film in which a surface is saponified with alkali may be used for the transparent base layer 466.

By doing this, a process for fabricating the polarizer 400 configured by the light control layer 450 and the polarizing layer 460 may be completed.

Figure 9J:
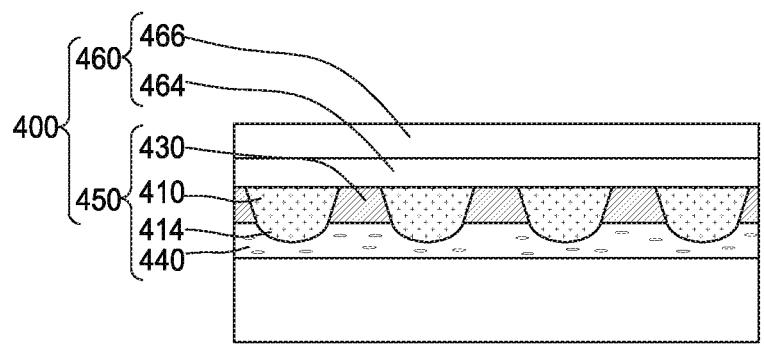

Next, as illustrated in FIG. 9J, the polarizer 400 is disposed on the organic electro luminescence display panel 300 to be bonded so that the fabricating process of the organic electro luminescence display device including the polarizer according to another exemplary embodiment of the present disclosure is completed. In this case, a part of the cholesteric liquid crystal layer 440 of the light control layer 410 which configures the polarizer 400 is in direct contact with an upper portion of the organic electro luminescence display panel 300 to be bonded.

Therefore, light traveling in a vertical direction among light emitted from the organic light emitting layer (not illustrated) of each pixel area of the organic electro luminescence display panel 300 is seen only by the user. Further, the traveling direction of the light traveling to left and right sides is changed by the partition 430 and the scattering unit 414 of the compensating layer 410 equipped in the light control layer 450 of the polarizer 400 so as to be seen only by the user. Therefore, a narrow viewing angle mode is implemented.

Further, in the organic electro luminescence display device according to another exemplary embodiment of the present disclosure, the compensating layer 410 in the polarizing layer is formed in the light control layer 450 so that an overall thickness of the display device may be reduced.

In the meantime, an organic electro luminescence display device including a polarizer according to another exemplary embodiment of the present disclosure will be described below with reference to FIG. 10.

Figure 10:
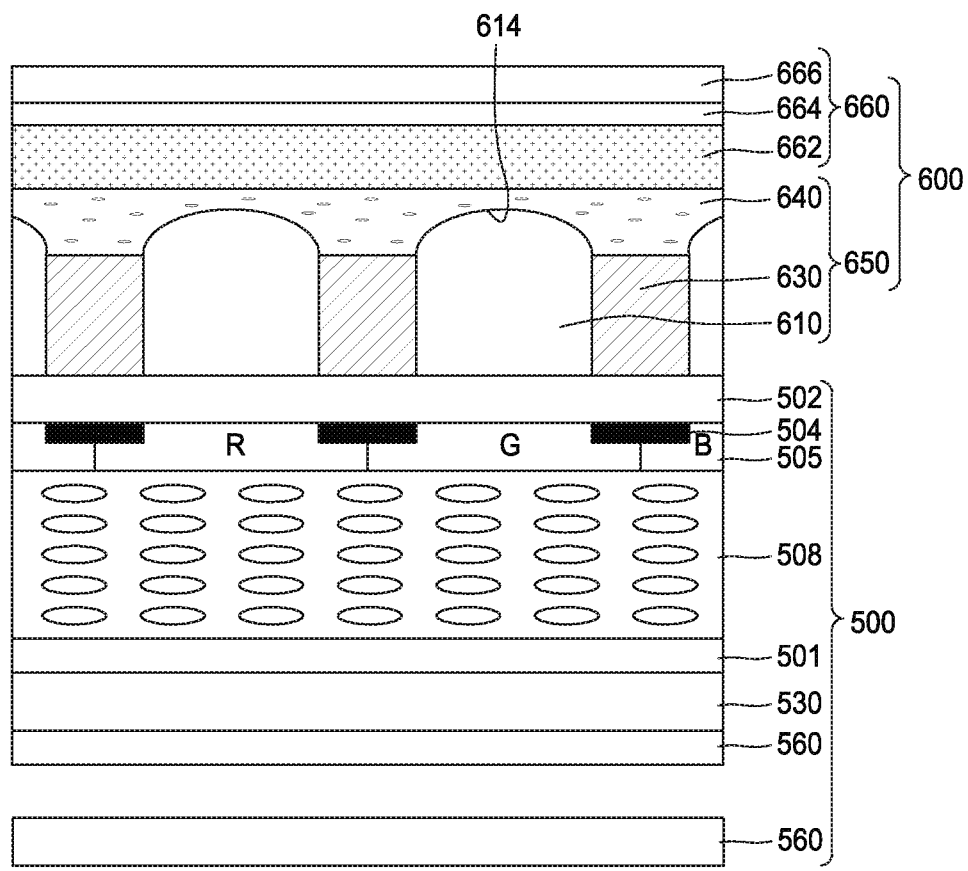
FIG. 10 is a cross-sectional view schematically illustrating a liquid crystal display device according to still another exemplary embodiment of the present disclosure.

FIG. 10 is a cross-sectional view schematically illustrating a liquid crystal display device according to still another exemplary embodiment of the present disclosure.

As illustrated in FIG. 10, the liquid crystal display device 100 according to still another exemplary embodiment of the present disclosure includes a liquid crystal panel 500 on which an image is displayed, an upper polarizer 600 disposed above the liquid crystal panel 500, a lower polarizer 530 disposed below the liquid crystal panel 500, and a backlight unit 560 which supplies light to the liquid crystal panel 500 below the lower polarizer 530.

Here, the liquid crystal panel 500 may include a thin film transistor array substrate 501, a color filter array substrate 502 which is disposed to be opposite to the thin film transistor array substrate 501, and a liquid crystal layer 508 formed between the two substrates 501 and 502.

The thin film transistor array substrate 501 includes a first substrate (not illustrated) and a thin film transistor array 503 including a plurality of thin film transistors (not illustrated) formed on the first substrate in a matrix.

The color filter array substrate 502 includes a second substrate (not illustrated), red, green, and blue color filters 505 formed on the second substrate (not illustrated), and a black matrix 504 which is formed between the color filters 505 to separate areas of the color filters 505 and suppress light leakage.

In the meantime, the upper polarizer 600 may include a light control layer 650 disposed above the liquid crystal display panel 500 and a polarizing layer 660 disposed above the light control layer 650.

In the meantime, the light control layer 650 which configures the polarizer 600 may include a plurality of partitions 630 which are spaced apart from each other, a transmissive unit 610 which is located between the partitions 630 and includes a scattering unit 614 thereabove, and a liquid crystal layer 640 disposed above the partitions 630 and the transmissive unit 610.

The transmissive unit 610 is an area to which light emitted from the liquid crystal display panel 500 transmits in a vertical direction.

The scattering unit 614 performs a function of scattering light emitted from the liquid crystal display panel 500. The scattering unit 614 may be formed to have a hemispherical, triangle, or polygonal convex projection shape.

The partition 630 performs a function of blocking viewing angle light. The partition 630 may be configured to have a rectangular, a triangular, or trapezoidal shape. The partition 630 may contain a black resin material.

The liquid crystal layer 640 may include a cholesteric liquid crystal CLC. In this case, the cholesteric liquid crystal improves luminance.

A polarizing layer 660 which configures the polarizer 600 may include a compensating layer 662, a linear polarizing layer 664 disposed above the compensating layer 662, and a transparent base layer 666 disposed above the linear polarizing layer 564.

The compensating layer 662 may be used as an anti-reflection layer which blocks external light entering from the outside. A material of the compensating layer may be selected from materials including quarter wave plate (QWP), PC, COP, and acyl.

Further, the linear polarizing layer 664 is formed by adsorbing a halogen salt crystal such as iodine onto a poly-vinyl alcohol (hereinafter, referred to as "PVA") film and then stretching the PVA film in a specific direction to align iodine crystals to be parallel in the stretching direction.

The iodine crystals absorb light which is incident in a first direction and transmits light which is incident in a second direction perpendicular to the first direction to achieve the polarizing function.

The transparent base layer 666 is a film which supports and protects the polarizing layer 660 and a constituent material thereof needs to be transparent and does not cause double refraction. Further, the transparent base layer 666 needs to have heat resistance and have a high mechanical strength to physically support and protect the polarizing layer 660.

Further, a surface thereof needs to be vast and have a property which is capable of being bonded to a bonding agent or an adhesive. For example, the constituent material includes acetate resin such as triacetyl cellulose (TAC), polyester resin, polyether sulfone resin, polycarbonate resin, polyamide resin, polyimide resin, polyolefin resin, acrylic resin, and polynorbornen resin.

In consideration of polarizing property and durability, desirably, a triacetyl cellulose (TAC) film in which a surface is saponified with alkali may be used for the transparent base layer 666.

Therefore, light traveling in a vertical direction among light which is supplied from the backlight unit 560 to be emitted from each pixel area of the liquid crystal display panel 500 is seen only by the user. Further, the traveling direction of the light traveling to left and right sides is changed by the partition 630 and the scattering unit 614 of the compensating layer 610 equipped in the light control layer 650 of the polarizer 600 so as to be seen only by the user. Therefore, a narrow viewing angle mode is also implemented in the liquid crystal display device.

FIG. 11 is a view obtained by measuring luminance and efficiency of an organic electro luminescence display device according to an exemplary embodiment of the present disclosure.

Referring to FIG. 11, when a polarizer according to an exemplary embodiment of the present disclosure is applied, luminance of the front side is reduced as compared with the polarizer of the related art.

However, at a viewing angle of 30 degrees, the lower the luminance ratio, the better the light blocking at the viewing angle. That is, the viewing angle luminance blocking performance is improved.

Further, since the cholesteric liquid crystal is applied in the present disclosure, a device efficiency of the organic electro luminescence display device is increased as compared with the related art.

The luminance which is reduced at the front side due to the usage of the partition in the present disclosure is improved by using the cholesteric liquid crystal (CLC).

Accordingly, in the present disclosure, it is understood that the light control layer including the partition and the cholesteric liquid crystal is applied so that the efficiency is improved.

Further, as illustrated in FIG. 11, it is understood that when a blue cholesteric liquid crystal (blue CLC) is applied, the luminance is improved as compared with the case when a white cholesteric liquid crystal (white CLC) is applied.

As described above, according to the polarizer, the method for fabricating the same, and the display device including the same of the present disclosure, partitions are formed in the polarizer for a display device to block the viewing angle and the reduced luminance is improved by coating the liquid cholesteric liquid crystal.

Further, in the polarizer, the method for fabricating the same, and the display device including the same of the present disclosure, when a cholesteric liquid crystal having a strong viewing angle dependency is coated, a light scattering unit with a projection shape is formed on an upper surface of the transmissive unit to improve the deterioration of viewing angle characteristic.

Further, as the cholesteric liquid crystal CLC of the present disclosure, white CLC or CLC of various wavelengths are applicable. Specifically, when the blue cholesteric liquid crystal (blue CLC) is applied, the efficiency of the organic electro luminescence display device may be improved.

In the polarizer, the method for fabricating the same, and the display device including the same of the present disclosure, the QWP layer is removed from the polarizing layer by forming a QWP layer which configures the polarizing layer in the light control layer so that an overall thickness of the display device is reduced.

Further, in the present disclosure, a light control layer for blocking viewing angle light is formed in the polarizer in the display device so that the luminance of the display device which implements a narrow viewing angle is improved and a lifespan and efficiency of the display device is also improved.

Further, in the present disclosure, a shape of the partition is changed using the cholesteric liquid crystal CLC and a black resin pattern so that a viewing angle color sensitive difference of the cholesteric liquid crystal may be improved.

Further, in the present disclosure, the partition and the cholesteric liquid crystal are integrated to form the light control layer in the polarizing layer so that an overall thickness of the display device may be reduced.

The polarizer according to the exemplary embodiments of the present disclosure and the method for fabricating the same and the display device having the same can also be described as follows:

According to an exemplary embodiment of the present disclosure, the polarizer includes a light control layer including a plurality of partitions, a transmissive unit which is provided between the partitions and includes a scattering unit thereabove, and a liquid crystal layer disposed above the partitions and the transmissive unit and a polarizing layer bonded to the light control layer.

The scattering unit of the light control layer may be configured to have a hemispherical, triangle, or polygonal convex projection shape.

The partitions may contain a black resin material.

The partitions may be configured to have a rectangular, a triangular, or trapezoidal shape.

The liquid crystal layer may include a cholesteric liquid crystal (CLC).

The polarizing layer may include a compensating layer, a linear polarizing layer PVA above the compensating layer, and a transparent base layer above the linear polarizing layer.

The transmissive unit may be configured as a compensating layer.

The polarizing layer may include a linear polarizing layer PVA and a transparent base layer above the linear polarizing layer.

The polarizing layer may be disposed above the liquid crystal layer of the light control layer.

The polarizing layer may be disposed above the transmissive unit and the partitions of the light control layer.

According to an exemplary embodiment of the present disclosure, the method for fabricating a polarizer includes forming a light control layer by forming a plurality of transmissive units which is spaced apart from each other and includes a scattering unit thereabove, forming partitions between the transmissive units, and forming a liquid crystal layer above the transmissive units and the partitions, forming a polarizing layer to be bonded to the light control layer, and bonding the polarizing layer to the light control layer.

The transmissive units may be formed of a transparent resin material.

The partitions may be formed of a black resin material.

The scattering unit of the transmissive unit may be formed to have a hemispherical, triangle, or polygonal convex projection shape.

The liquid crystal layer may include a cholesteric liquid crystal (CLC).

The partitions may be formed to have a rectangular, a triangular, or trapezoidal shape.

The polarizing layer may include a compensating layer, a linear polarizing layer formed above the compensating layer, and a transparent base layer.

The polarizing layer may include a linear polarizing layer and a transparent base layer.

The forming of partitions between transmissive units may include filling black resin in openings between the transmissive units which are spaced apart from each other and curing the black resin.

The forming of a liquid crystal layer above the transmissive units and the partitions may include coating a liquid cholesteric liquid crystal on an entire surface of the transmissive units and the partitions and curing the cholesteric liquid crystal.

The polarizing layer may be bonded onto a liquid crystal layer of the light control layer.

The polarizing layer may be bonded onto the transmissive units and the partitions of the light control layer.

According to an exemplary embodiment of the present disclosure, the display device includes a display panel in which an image is implemented and the polarizer disposed above the display panel.

The display panel may be a display panel of an organic electro luminescence display device.

The display panel may be a display panel of a liquid crystal display device.

It will be appreciated by those skilled in the art that the present disclosure as described above may be implemented into other specific forms without departing from the technical spirit thereof or essential characteristics.

Thus, it is to be appreciated that embodiments described above are intended to be illustrative in every sense, and not restrictive. The scope of the present disclosure is represented by the claims to be described below rather than the detailed description, and it is to be interpreted that the meaning and scope of the claims and all the changes or modified forms derived from the equivalents thereof come within the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A polarizer, comprising:
   a light control layer including:
     a plurality of partitions,
     a light transmissive unit positioned between the partitions, the light transmissive unit including a scattering element, and
     a liquid crystal layer disposed on the partitions and the light transmissive unit, wherein the liquid crystal layer includes a cholesteric liquid crystal (CLC); and
   a polarizing layer bonded to the light control layer.

2. The polarizer according to claim 1, wherein the scattering element of the light control layer has at least one of a hemispherical, triangle, or polygonal convex projection shape.

3. The polarizer according to claim 1, wherein the partitions contain a black resin material.

4. The polarizer according to claim 1, wherein the partitions have at least one of a rectangular, a triangular, or a trapezoidal shape.

5. The polarizer according to claim 1, wherein the polarizing layer includes a compensating layer on the liquid crystal layer, a linear polarizing layer on the compensating layer, and a transparent base layer on the linear polarizing layer.

6. The polarizer according to claim 1, wherein the light transmissive unit is configured as a compensating layer.

7. The polarizer according to claim 6, wherein the polarizing layer includes a linear polarizing layer and a transparent base layer on the linear polarizing layer.

8. The polarizer according to claim 1, wherein the polarizing layer is disposed on the liquid crystal layer of the light control layer.

9. The polarizer according to claim 1, wherein the polarizing layer is disposed on the light transmissive unit and the partitions of the light control layer.

10. A method for fabricating a polarizer, comprising:
forming a light control layer by:
forming a plurality of light transmissive units spaced apart from one another, each of the light transmissive units including a scattering element,
forming partitions between the light transmissive units, and
forming a liquid crystal layer on the light transmissive units and the partitions, wherein the liquid crystal layer includes a cholesteric liquid crystal (CLC);
forming a polarizing layer; and
bonding the polarizing layer to the light control layer.

11. The method according to claim 10, wherein the light transmissive units are formed of a transparent resin material.

12. The method according to claim 10, wherein the partitions are formed of a black resin material.

13. The method according to claim 10, wherein the scattering elements of the light transmissive units are formed to have at least one of a hemispherical, triangle, or polygonal convex projection shape.

14. The method according to claim 10, wherein the partitions are formed to have at least one of a rectangular, a triangular, or a trapezoidal shape.

15. The method according to claim 10, wherein the polarizing layer includes a compensating layer, a linear polarizing layer formed on the compensating layer, and a transparent base layer.

16. The method according to claim 10, wherein the polarizing layer includes a linear polarizing layer and a transparent base layer.

17. The method according to claim 10, wherein forming partitions between the light transmissive units includes:
filling openings between the light transmissive units with a black resin; and
curing the black resin.

18. The method according to claim 10, wherein forming a liquid crystal layer on the light transmissive units and the partitions includes:
coating the cholesteric liquid crystal on an entire surface of the light transmissive units and the partitions; and
curing the cholesteric liquid crystal.

19. The method according to claim 10, wherein the polarizing layer is bonded onto the liquid crystal layer of the light control layer.

20. The method according to claim 10, wherein the polarizing layer is bonded onto the light transmissive units and the partitions of the light control layer.

21. A display device, comprising:
a display panel in which an image is implemented; and
a polarizer disposed on the display panel, the polarizing including a light control layer and a polarizing layer bonded to the light control layer, the light control layer including:
a plurality of partitions,
a light transmissive unit positioned between the partitions, the light transmissive unit including a scattering element, and
a liquid crystal layer disposed on the partitions and the light transmissive unit.

22. The display device according to claim 21, wherein the display panel is a display panel of an organic electro luminescence display device.

23. The display device according to claim 21, wherein the display panel is a display panel of a liquid crystal display device.

* * * * *